UNITED STATES PATENT OFFICE.

CLAUDE SAVIGNY, OF LYONS, FRANCE, ASSIGNOR OF ONE-HALF TO BARTHÉLEMY MARTINON, OF SAME PLACE.

PROCESS OF TREATING THE MOTHER-LIQUORS OF PHENOL NITRATES.

SPECIFICATION forming part of Letters Patent No. 412,680, dated October 8, 1889.

Application filed May 8, 1889. Serial No. 310,031. (No specimens.) Patented in France May 25, 1887, No. 183,749.

*To all whom it may concern:*

Be it known that I, CLAUDE SAVIGNY, dyer, a citizen of the Republic of France, and a resident of Lyons, France, have invented certain new and useful improvements relating to the treatment of the mother-liquors resulting from the manufacture of nitro-phenols, nitro-cresols, and other nitrated substances, and to the nitrification of phenols, cresols, naphthols, naphthalines, and the like, (for which I have obtained a patent in France, No. 183,749, bearing date May 25, 1887,) of which the following is a specification.

This invention relates to the separation of the substances which are contained in mother-liquors resulting from the manufacture of nitro-phenols, nitro-cresols, and other nitrated substances, and to the nitrification of phenols, cresols, naphthols, naphthalines and the like.

Mother-liquors resulting from the manufacture of nitro-phenols, nitro-cresols, and other nitrated substances have heretofore been utilized only to a limited extent, as the mixture of the various substances constituting these mother-liquors (such as picric acid, nitro-cresylic acid and the like, free nitric acid, oxalic acid, and more especially sulphuric acid which has served for sulpho-conjugation) has formed an obstacle to the utilization of these mother-liquors, thus causing a considerable loss of various substances possessing a certain value.

According to my aforesaid invention the various substances contained in the said mother-liquors are separated, so that they will severally have their full or approximately full commercial value, which they do not possess in a state of mixture. For this purpose the mother-liquors which are at between 15° and 45° Baumé are heated until they will be at between 48° and 52°. A large portion of the free nitric acid distills and is collected in receptacles. The mother-liquors thus freed from most of their free nitric acid are then allowed to cool, thereby causing the largest portion of the picric or nitro-cresylic acid which they contain to be deposited, which nitrated substances are separated. There now remains in the mother-liquors which are at between 48° and 52° Baumé a little picric acid, a little oxalic acid, and more especially sulphuric acid—in other words, sulphuric acid at about 50° Baumé, which is polluted with a little picric acid, nitro-cresylic acid and the like, and oxalic acid. In this state the mixture can be used for various purposes. It can, however, be further treated in two ways for the purpose of either separating therefrom more picric acid or obtaining more concentrated sulphuric acid. In the former case, where it is not desired to have concentrated sulphuric acid, water is simply added to the said mother-liquors which are already in a heated state, so that they will be at about 15° Baumé. The picric acid being less soluble in sulphuric acid at 15° than in sulphuric acid at 48° or 52° Baumé, a fresh quantity will be precipitated therefrom, which can be collected.

In the second case above mentioned the mother-liquors which are at about 50° Baumé are heated in an open vessel, the sulphuric acid being gradually concentrated to 60° or 62° Baumé, and the oxalic acid being decomposed into gases, which escape. If the concentration is then increased to about 65° or 66° Baumé, almost pure sulphuric acid is obtained, for the last traces of picric acid, nitro-cresylic acid, and the like are thereby eliminated. This sulphuric acid at 65° or 66° Baumé can be employed in all cases where ordinary sulphuric acid is used. There is nothing to prevent the arrest of the concentration at about 60° or 62° Baumé, at which it will still contain a little picric acid and other nitrated substances.

I have observed that in certain cases the lyes to be treated contain phenols, cresols, and the like which are not nitrated. For the purposes of utilizing these substances it is necessary in the course of the operation, when the concentration of the liquor is sufficient, to add either nitric acid or nitrates in sufficient quantity, according to the quantity of the phenols, cresols, and the like which are to be nitrated. This employment in presence of sulphuric acid of nitrates, either alone or mixed with nitric acid, for effecting the nitrification of phenols, cresols, and the like can be adopted with advantage in the manufacture of nitro-phenols, nitro-cresols and the like, and for this reason it constitutes an improvement upon the process of nitrification by means of nitric acid as heretofore practiced. The sulphuric acid can be replaced by any other substance capable of displacing the nitric acid from the nitrates.

What I claim is—

1. The process herein described of separating the various substances contained in mother-liquors resulting from the manufacture of nitro-phenols and other nitrated substances, which consists in heating the mother-liquors and distilling nitric acid therefrom, and then cooling the mother-liquors and precipitating picric or nitro-cresylic acid, substantially as described.

2. The process herein described of separating the various substances contained in mother-liquors resulting from the manufacture of nitro-phenols and other nitrated substances, which consists in heating the mother-liquors and distilling the nitric acid therefrom, cooling the mother-liquors and precipitating picric or nitro-cresylic acid, and heating the mother-liquors and concentrating the sulphuric acid, substantially as set forth.

3. The process herein described of separating the various substances contained in mother-liquors resulting from the manufacture of nitro-phenols and other nitrated substances, which consists in heating the mother-liquors and distilling nitric acid therefrom, cooling the mother-liquors and precipitating picric or nitro-cresylic acid, heating the mother-liquors and concentrating the sulphuric acid, and adding nitrates to effect the nitrification of phenols, cresols, and the like, substantially as set forth.

In testimony whereof I have hereunto signed my name in the presence of two subscribing witnesses.

CLAUDE SAVIGNY.

Witnesses:
XAVIER JANICOT,
GEORGES FREYDIER DUBREUL.